United States Patent [19]
Jung

[11] Patent Number: 5,606,424
[45] Date of Patent: Feb. 25, 1997

[54] SIMPLE HIGH-BAND RECORD MODULATION CIRCUIT IN 8MM VIDEO TAPE RECORDER

[75] Inventor: Mun-joo Jung, Suwon, Rep. of Korea

[73] Assignee: Samsung Electronics Co., Ltd., Kynugki-do, Rep. of Korea

[21] Appl. No.: 471,687

[22] Filed: Jun. 6, 1995

[30] Foreign Application Priority Data

Jul. 26, 1994 [KR] Rep. of Korea .................. 94-18070

[51] Int. Cl.$^6$ ........................................ H04N 5/92
[52] U.S. Cl. .............................. 386/26; 386/9
[58] Field of Search ...................... 358/310, 315, 358/330, 335, 316; 360/33.1; 348/613; H04N 5/92, 5/782

[56] References Cited

U.S. PATENT DOCUMENTS

| | | | |
|---|---|---|---|
| 4,200,889 | 4/1980 | Strobele | 348/613 |
| 4,524,380 | 6/1985 | Shibata et al. | 358/316 |
| 4,792,862 | 12/1988 | Tsusue et al. | 358/330 |
| 4,963,991 | 10/1990 | Honjo | 358/310 |
| 5,032,925 | 7/1991 | Ganse et al. | 358/310 |
| 5,223,945 | 6/1993 | Honda et al. | 358/330 |
| 5,255,101 | 10/1993 | Okada | 358/330 |

Primary Examiner—Thai Q. Tran
Assistant Examiner—Huy Nguyen
Attorney, Agent, or Firm—Sughrue, Mion, Zinn, Macpeak & Seas

[57] ABSTRACT

A record modulation circuit having a first frequency deviation amount determiner for determining the frequency deviation amount suitable for a normal recording mode, and a second frequency deviation amount determiner for determining the frequency deviation amount suitable for a high-band recording mode, wherein an 8 mm video tape recorder for normal recording can perform a simple high-band recording. The record modulation circuit is hereby enabled to perform a normal recording operation and a high-band recording operation with only a normal recording IC.

6 Claims, 5 Drawing Sheets

SIMPLE HIGH-BAND RECORD MODULATION CIRCUIT IN 8MM VIDEO TAPE RECORDER

BACKGROUND OF THE INVENTION

The present invention relates to a record modulation circuit in an 8 mm video tape recorder, and more particularly to a record modulation circuit which enables high-band recording in a video tape recorder used for normal recording.

An 8 mm video tape recorder (hereinafter called VTR), uses a magnetic tape of compact size as a recording medium and is widely used to enable recorders for home use to become smaller and lighter.

8 mm VTRs are divided into a normal type and a high-band type according to the frequency band of a luminance signal. The resolution of the latter is about 350 lines, which is higher than that of the former of about 250 lines.

In a high-band 8 mm VTR, a luminance signal is modulated by using a higher frequency band than used in an 8 mm VTR of a normal type. Accordingly a particular frequency modulation circuit has to be provided for the high-band 8 mm VTR. However, the particular frequency modulation circuit is expensive and result is excessive production costs.

SUMMARY OF THE INVENTION

Therefore, it is an object of the present invention to provide a record modulation circuit which enables high-band recording even in an 8 mm VTR of a normal type.

To accomplish the above object of the present invention, there is provided a record modulation circuit in an 8 mm VTR having a pre-emphasis portion for emphasizing a high frequency band of a luminance signal, a clipping portion for limiting the level of the luminance signal emphasized by the pre-emphasis portion, a frequency modulation (FM) portion for generating an FM-converted luminance signal which is suitable for a normal recording mode, after receiving the luminance signal output from the clipping portion, and supplying to a recording head the FM-converted luminance signal, and a frequency converter for receiving a chrominance signal and producing a low-band-converted chrominance signal, and supplying to the recording head the low-band-converted chrominance signal, the record modulation circuit comprising:

a first frequency deviation amount determiner for determining a frequency deviation amount suitable for a normal recording mode of said frequency modulation portion; and a second frequency deviation amount determiner for determining a second frequency deviation amount suitable for a high-band recording mode of said frequency modulation portion.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

In general, a video signal has a wide frequency band ranging from about 30 Hz to 4 MHz. Thus, if the video signal is supplied to a recording head as it is as in recording an audio signal, a normal result is not achieved. Accordingly, a video signal is recorded through frequency modulation, hereinafter called FM, in the VTR. An FM carrier frequency uses a high frequency of about 4 to 10 MHz. There are various methods for record modulation. Among these methods are multiple recording method for low-band-converting a chrominance signal and FM-converting a luminance signal, an FM recording method for low-band-converting a chrominance signal, and a method for separately recording a luminance signal and a chrominance signal.

A recording method widely used in VTRs for home use is a multiple recording method of low-band-converting a chrominance signal and FM-converting a luminance signal, and the same method is applied to recording a video signal in an 8 mm VTR of a normal type.

Figure 1:
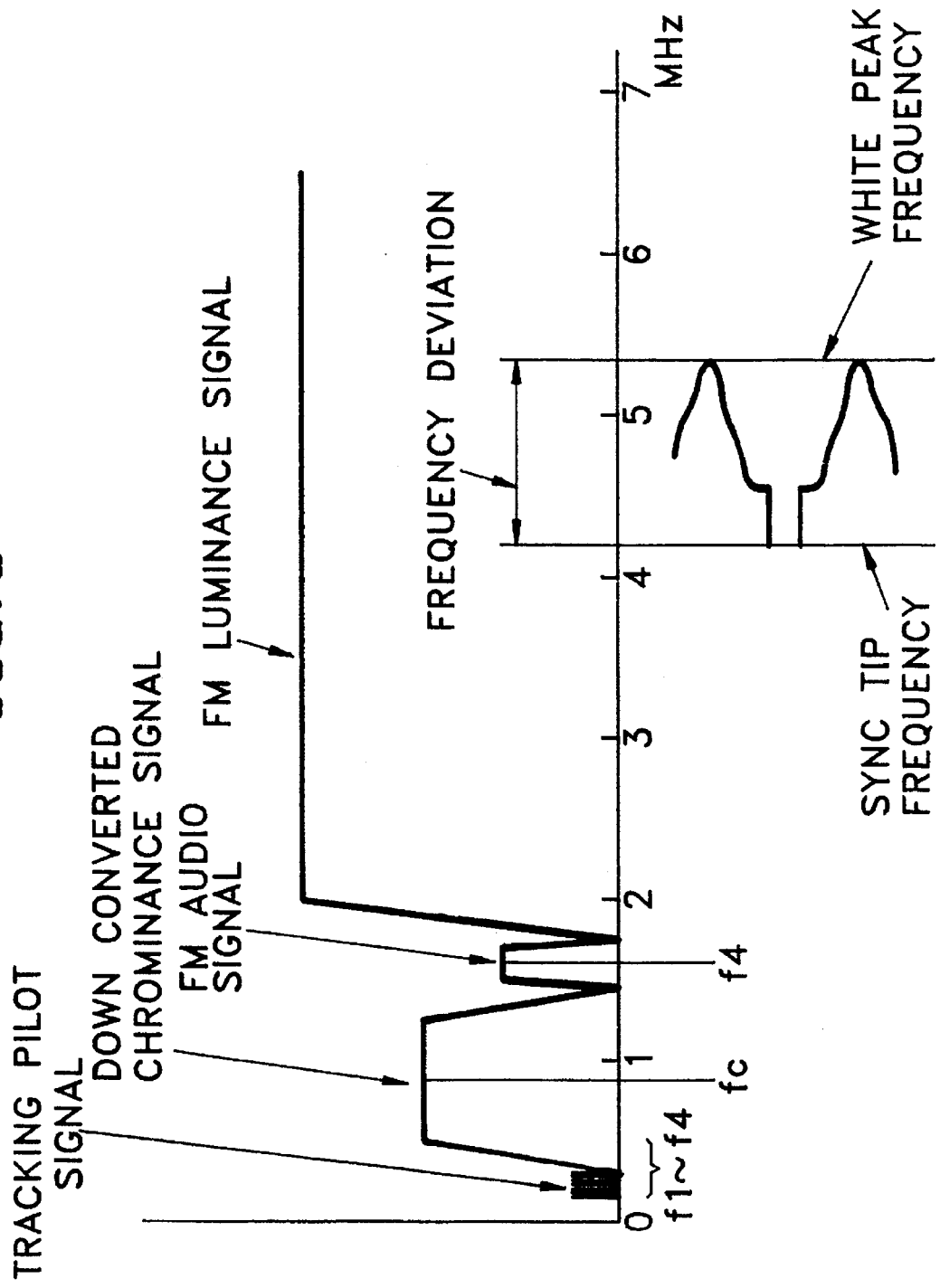
FIG. 1 shows a frequency spectrum of an FM-modulated video signal in an 8 mm VTR of a normal type.

FIG. 1 shows a frequency spectrum of a record-modulated video signal in an 8 mm VTR of a normal type. Here, four pilot signals for tracking exist in the lowest frequency band. An 8 mm VTR uses a tracking method employing multiple frequencies and does not have a control track as a VHS type VTR has. A chrominance signal is a signal which is low-band-converted to a center frequency of 743 KHz, while an audio signal occupies the band of 1.5 MHz to 1.7 MHz.

In the normal type 8 mm VTR, a luminance signal has a tip of a synchronization signal, hereinafter called the sync tip, of 4.2 MHz and a white peak of 5.4 MHz, and accordingly has a frequency deviation amount of 1.2 MHz.

Figure 2:
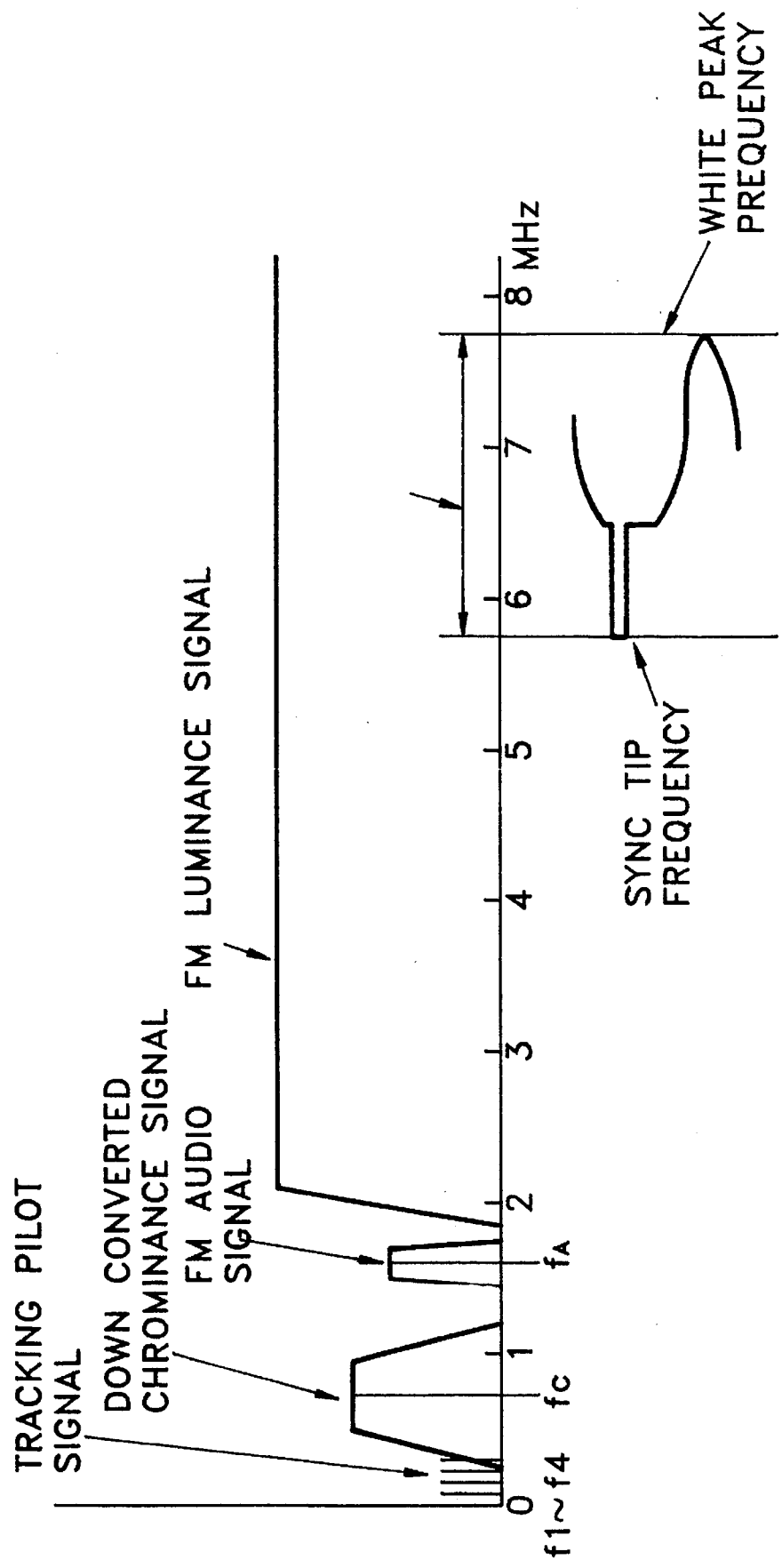
FIG. 2 shows a frequency spectrum of an FM-modulated video signal in a high-band 8 mm VTR.

FIG. 2 shows a frequency spectrum of a record-modulated video signal in a high-band 8 mm VTR. A main difference between the high-band 8 mm VTR is and the normal type 8 mm VTR that a luminance signal band of the former is higher than that of the latter. In addition, the pre-emphasis amounts are different from each other and a chrominance signal of the former is larger than that of the latter.

In the high-band 8 mm VTR, a luminance signal has a sync tip of 5.7 MHz and a white peak of 7.7 MHz and accordingly has a frequency deviation amount of 2 MHz.

Figure 3:
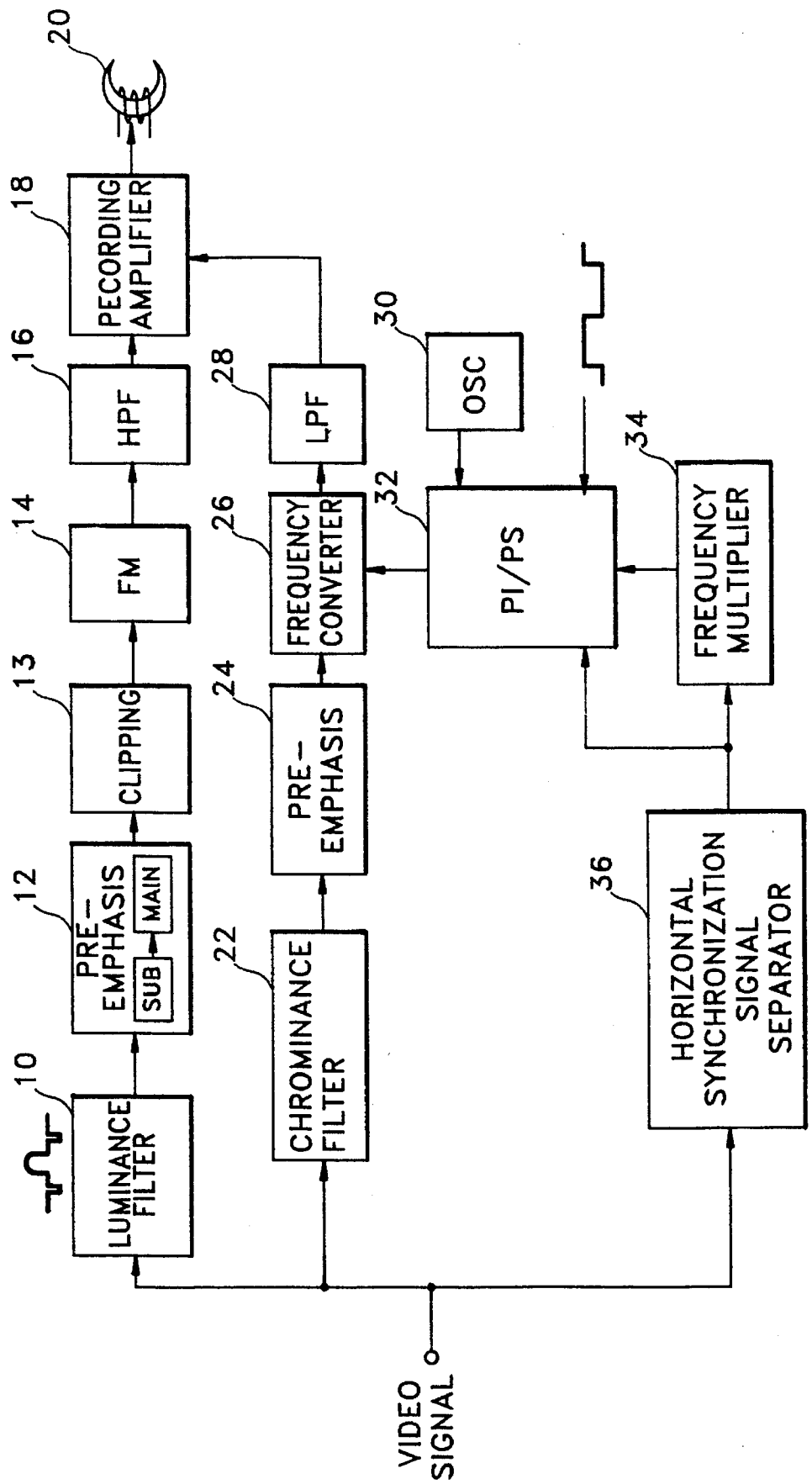
FIG. 3 is a block diagram showing a general video frequency modulation circuit.

FIG. 3 is a block diagram showing a record modulation circuit having a multiple recording method for low-band-converting a chrominance signal and FM-converting a luminance signal, which is applied to a normal type 8 mm VTR. In FIG. 3 the upper part shows the recording system of a luminance signal, and the lower part shows the recording system of the chrominance signal.

The luminance signal is separated by a luminance signal detector 10 such as a comb filter or a low pass filter, and is then supplied to a pre-emphasis portion 12. The pre-emphasis portion 12 is for improving the signal-to-noise ratio of the luminance signal and emphasizes a high frequency band. A clipping portion 13 carries out clipping so as to prevent overmodulation in an FM portion 14 following the pre-emphasis portion 12. An FM portion 14 modulates a luminance signal including a synchronization signal to a given frequency band and outputs the modulated signal. The luminance signal modulated through the FM portion 14 is supplied to a recording head 20 through high pass filter 16 and a recording amplifier 18.

Meanwhile, a chrominance signal is Separated by a chrominance signal detector 22 such as a comb filter, or a band pass filter, and is then supplied to a pre-emphasis portion 24. The pre-emphasis portion 24 emphasizes a high-band component of a chrominance signal, and supplies the result to a frequency converter 26.

In the frequency converter 26 having a balanced modulator, a low-band-converted chrominance signal is output by performing a heterodyne detection operation. The low-band-converted chrominance signal which is output from the frequency converter 26 is supplied to a recording head 20 through low pass filter 28 and then recorded on a magnetic tape after multiplexing frequency with the luminance signal. A reference numeral 30 shows a local oscillator, 32 a phase invert/phase shift (PI/PS) processor, 34 a frequency multiplier, and 36 a horizontal synchronization signal separator.

Pre-emphasis portion 12, clipping portion 13, and frequency modulation portion 14 shown in FIG. 3 are usually embodied in an integrated circuit, hereinafter called a recording integrated circuit (IC).

In general, a normal type 8 mm VTR and a high-band 8 mm VTR have different frequency bands of luminance signals to be recorded and the recording heads have different frequency characteristics. Therefore, each type of VTR uses a different recording IC and a different recording head. Furthermore, the recording IC applied to the high-band 8 mm VTR is so expensive that it causes a substantial increase in the cost of production of the VTR.

Figure 4:
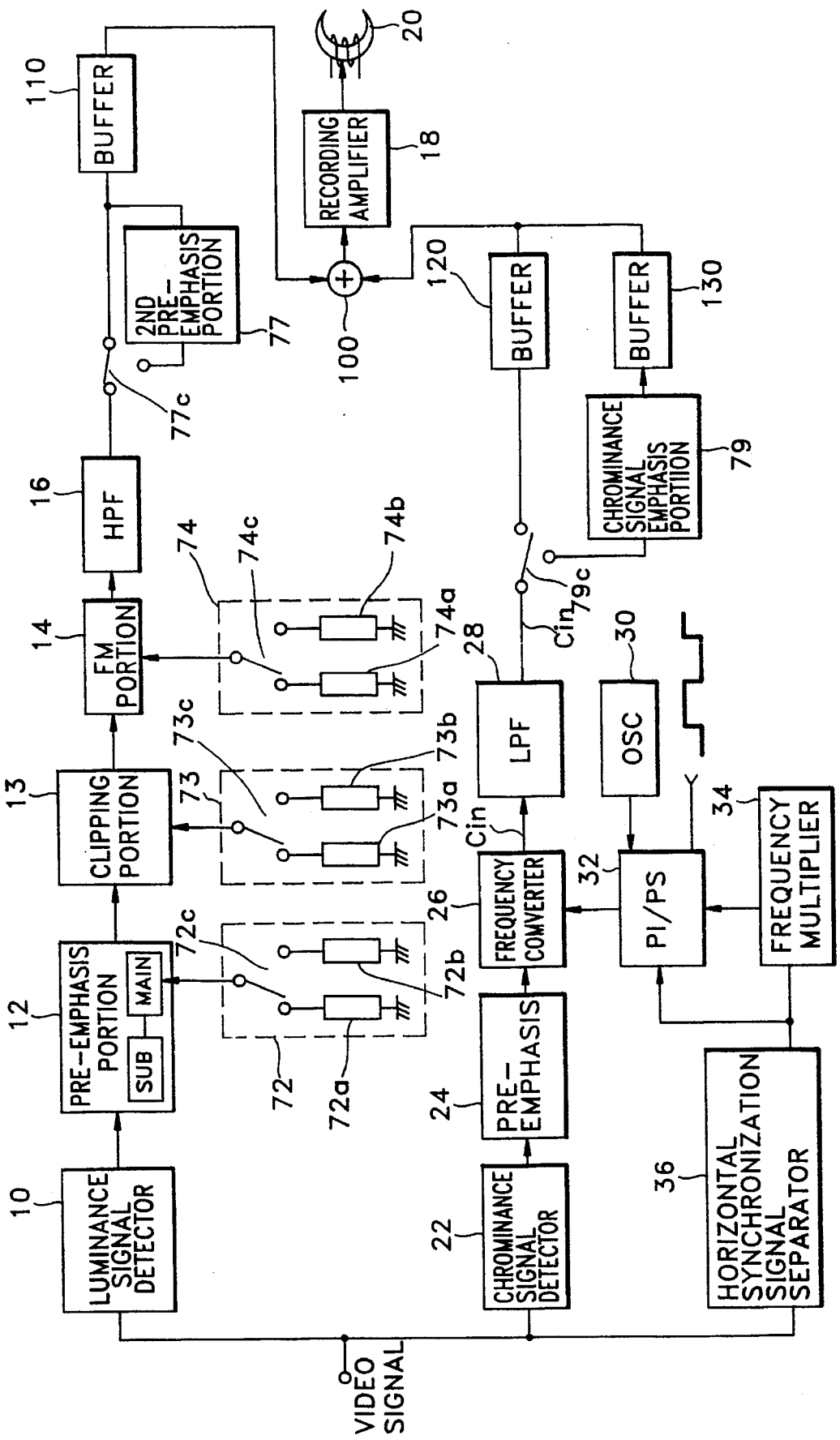
FIG. 4 is a block diagram showing a structure of a simple high-band record modulation circuit according to the present invention.

FIG. 4 is a block diagram showing a record modulation circuit according to the present invention. In FIG. 4, a reference numeral 72 is an emphasis amount determiner for determining a main-emphasis amount in a pre-emphasis portion 12, 72a a first emphasis amount determiner for determining the main-emphasis amount in a normal recording mode, and 72b a second emphasis amount determiner for determining the main-emphasis amount in a high-band recording mode. The first and second emphasis amount determiners 72a and 72b are switched by a main emphasis amount control switch 72c, and then connected to pre-emphasis portion 12.

A reference numeral 73 is a clipping amount determiner for determining a white/dark (hereinafter called W/D) clipping amount in a clipping portion 13, 73a a first clipping amount determiner for determining the W/D clipping amount in a normal recording mode, and 73b a second clipping amount determiner for determining the W/D clipping amount in a high-band recording mode. The first and second clipping amount determiners 73a and 73b are switched by a clipping amount control switch 73c, and then connected to clipping portion 13.

In Table 1, the clipping amounts in normal and high-band recording modes are compared with each other.

TABLE 1

| MODE | White clip level | Dark clip level |
| --- | --- | --- |
| Normal recording mode | 220% in sync tip | 90% in sync tip |
| High-band recording mode | 220% in sync tip | 100% in sync tip |

A reference numeral 74 is a frequency deviation amount determiner for determining a frequency deviation amount in a frequency modulation portion 14, 74a a first frequency deviation amount determiner for determining the frequency deviation amount in a normal recording mode, and 74b a second frequency deviation amount determiner for determining the frequency deviation amount in a high-band recording mode. The first and second frequency deviation amount determiners 74a and 74b are switched by a frequency deviation amount control switch 73c, and then connected to frequency modulation portion 14.

In Table 2 frequency deviations in normal recording and in high-band recording are compared with each other.

TABLE 2

| MODE | Sync tip | White peak | Deviation |
| --- | --- | --- | --- |
| Normal recording mode | 4.2 MHz | 5.4 MHz | 1.2 MHz |
| high-band 8 mm VTR | 5.7 MHz | 7.7 MHz | 2 MHz |

A reference numeral 77 is a second pre-emphasis portion for compensating for the signal which is lost in a high frequency band due to characteristics of a recording head used in the normal type 8 mm VTR and for emphasizing signals in the band of about 8 MHz.

The second pre-emphasis portion 77 is inserted in only a simple high-band recording mode under the control of second pre-emphasis control switch 77c.

A reference numeral 79 is a chrominance signal emphasizing portion for enhancing the size of a chrominance signal in a simple high-band recording mode compared to that in a normal recording mode. The chrominance signal emphasizing portion 79 is inserted in only a simple high-band recording mode under the control of a chrominance signal emphasizing portion control switch 79c.

Figure 5:
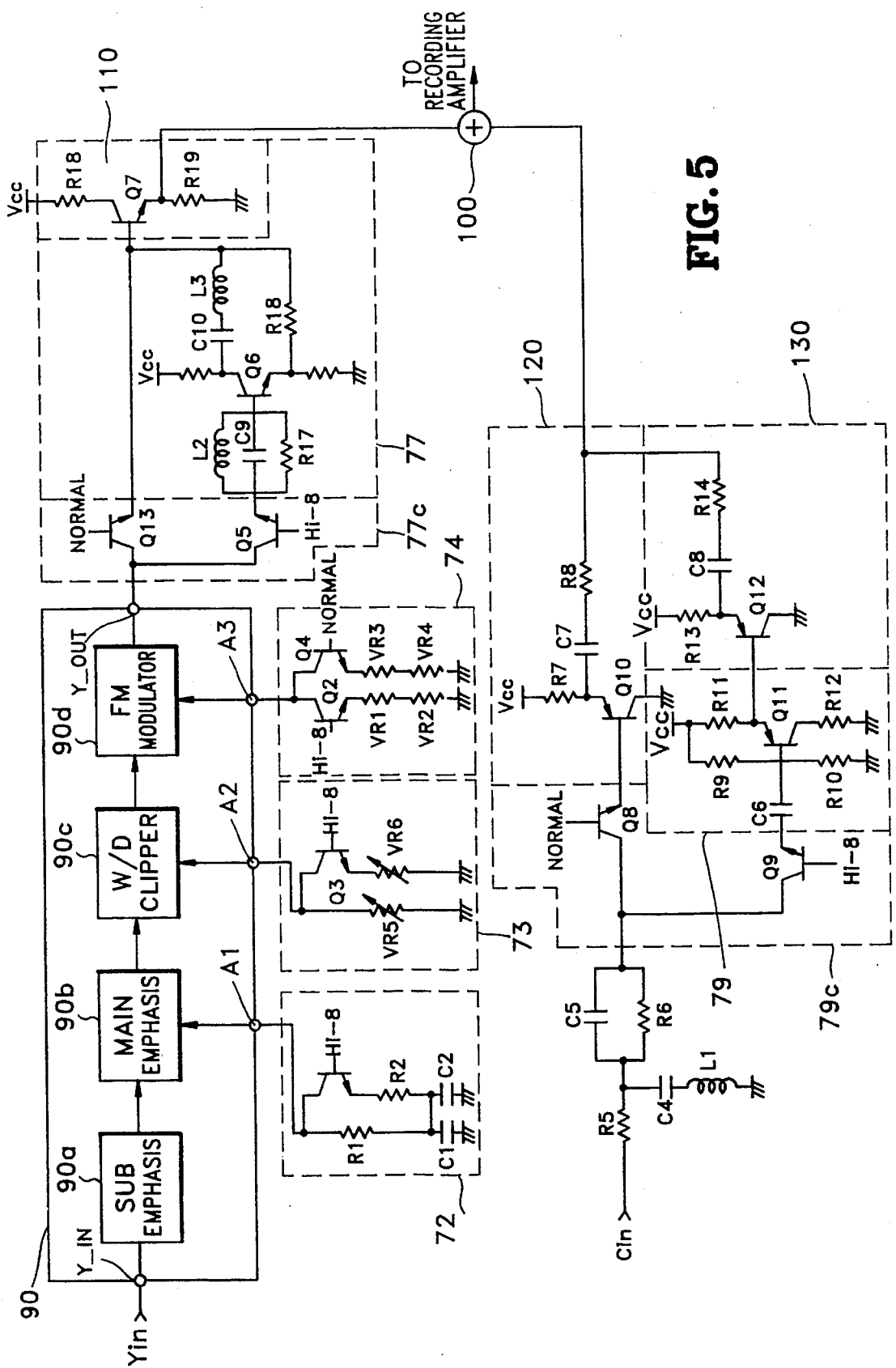
FIG. 5 is a circuit diagram of a detailed structure of a device shown in FIG. 4.

FIG. 5 is a circuit diagram illustrating a more detailed structure of the circuit shown in FIG. 4. A reference numeral 90 is a recording IC for FM-converting the luminance signal which is output from a luminance signal detector 10 and supplying recording head 20 with the FM-converted luminance signal. The recording IC includes a sub-emphasis portion 90a, a main-emphasis portion 90b, a clipping portion 90c, and an FM portion 90d.

In the recording IC 90, a luminance signal input from a luminance signal input end Y_IN is FM-converted, and then output via a luminance signal output end Y_OUT. The luminance signal input from the luminance signal input end Y_IN is sub-emphasized by sub-emphasis portion 90a, and then main-emphasized by main-emphasis 90b.

The sub-emphasis portion 90a is for dynamically emphasizing frequency characteristics according to the level change of the input signal. In the past, processed only main-emphasis, but recent VTR's process not only main-emphasis but also sub-emphasis.

The luminance signal emphasized by main emphasis portion 90b is processed by clipping portion 90c so as to prevent overmodulation from arising in FM portion 90d due to an excessively emphasized frequency component. The clipping portion 90c clips a white component more than a predetermined level and a dark component less than a predetermined level.

FM portion 90d modulates the luminance signal output from clipping portion 90c into a luminance signal suitable for recording, and then outputs it via luminance signal output end Y_OUT.

Reference numeral 72 designates is a main-emphasis amount determiner for generating a main-emphasis amount adjusting voltage which is supplied to a main-emphasis amount adjusting input end A1 of recording IC 90; 73 designates a clipping amount determiner for generating a clipping amount adjusting voltage which is supplied to a clipping amount adjusting input end A2 of recording IC 90, and 74 designates a frequency deviation amount determiner for generating a frequency deviation amount adjusting voltage which is supplied to frequency deviation amount adjusting input end A3 in FM portion 90d of a recording IC 90. Reference numeral 77 designates is a second pre-emphasis portion, and 79 designates a chrominance signal emphasizing portion.

A description of an operation of the circuit shown in FIG. 5 in a normal recording mode and in a simple highband recording mode follows.

1) An operation in a normal recording mode:

The luminance signal is modulated by the main-emphasis amount which is determined by resistor R1 and two capacitors C1 and C2; the W/D clipping amount is determined by a variable resistor VR5; and the frequency deviation amount is determined by variable resistors VR3 and VR4.

The variable resistor VR3 determines the frequency deviation amount, which is controlled to 1.2 MHz, the variable resistor VR4 determines a base band frequency, which is controlled to 4.2 MHz. In a normal recording mode, a signal representing the normal recording mode is in a high state, while a signal representing the simple high-band recording mode is in a low state. Accordingly, the base band frequency and the frequency deviation amount which are determined by the variable resistors VR3 and VR4 via a transistor Q4, determine an operation range in FM portion 90d of recording IC 90.

The FM-converted luminance signal output from recording IC 90 is supplied a recording amplifier (not shown) through a buffer 110 including a transistor Q7 and adder 100.

Meanwhile, a chrominance signal, from which a high frequency component in the band of 7 MHz is removed through a band pass filter including a resistor R5, a capacitor C4 and a reactor L1, passes through an RC filter including a capacitor C5 and a resistor R6, and then is supplied to the recording amplifier through a buffer 120 including a transistor Q10.

2) An operation in a simple high-band recording mode:

The luminance signal is modulated by the main-emphasis amount which resistors R1 and R2, and capacitors C1 and C2 determine, the W/D clipping amount which variable resistors VR5 and VR6 determine, and the frequency deviation amount which variable resisitors VR1 and VR2 determine.

The variable resistor VR1 controls the frequency deviation amount, which is controlled to 2 MHz, and the variable resistor VR2 determines a base band frequency, which is controlled to 5.7 MHz. In a simple high-band recording mode, a signal Hi-8 representing the simple high-band recording mode is in a high state, while a signal representing a normal recording mode is in a low state. Accordingly the base band frequency and the frequency deviation amount which are determined by the variable resistors VR1 and VR2 via a transistor Q2, determine an operation range in FM portion 90d of recording IC 90.

The FM-converted luminance signal output from recording IC 90 is supplied to a recording amplifier through a second pre-emphasis circuit 77 including a resistor R17, a capacitor C9 and a reactor L2, an all-pass-filter (APF) including a transistor Q6, a capacitor C10, a reactor L3 and a resistor R18, buffer 110 and adder 100.

A head used in normal recording mode generates loss in the high frequency 8 MHz band. Therefore, this can be compensated by peaking an 8 MHz band through second pre-emphasis circuit 77 and passing the resulting signal through the APF having a delay time.

Meanwhile, a chrominance signal, from which a high frequency component in the band of 7 MHz is removed through a band pass filter including a resistor R5, a capacitor C4 and a reactor L1, passes through an RC filter including a capacitor C5 and a resistor R6, and then is supplied to a recording amplifier through a buffer 120 including a transistor Q12 and adder 100 after being amplified through an amplifying circuit including a transistor Q11.

In the simple high-band recording mode, the level of the chrominance signal is amplified by an amplifying circuit 79, to compensate for the lower level of the chrominance signal relative to the level of the chrominance signal in the normal recording mode.

A high-band recording with a head which is used in a normal recording is applied to the maximum permissible frequency of the normal head. That is, the resolution of about 280 lines can be obtained. This represents a considerable improvement in the resolution, compared with the resolution of about 250 lines in the normal recording.

As described above, a record modulation circuit according to the present invention enables not only a normal recording but also a high-band recording with only one recording IC.

What is claimed is:

1. A record modulation circuit in an 8 mm video tape recorder, the record modulation circuit comprising:

a single pre-emphasis means for emphasizing a high frequency band of an input luminance signal to produce an emphasized luminance signal, a single clipping means for limiting the level of said input luminance signal emphasized by said pre-emphasis means to produce a limited luminance signal, a single frequency modulation (FM) means for generating an FM-converted luminance signal which is suitable for a normal recording mode, after receiving said limited luminance signal output from said clipping means, and supplying to a recording head the FM-converted luminance signal, a frequency converter for receiving a chrominance signal and producing a low-band-converted chrominance signal, and supplying to the recording head the low-band-converted chrominance signal, a first frequency deviation amount determiner for determining a frequency deviation amount suitable for a normal recording mode of said frequency modulation means, and a second frequency deviation amount determiner for determining a second frequency deviation amount suitable for a simple high-band recording mode of said frequency modulation means, wherein said single frequency modulation means modulates each limited luminance signal which is input in the normal recording mode and the simple high-band recording mode, within the limits of the frequency deviation amount determined by one of said first frequency deviation amount determiner and said second frequency amount determiner.

2. A record modulation circuit according to claim 1, further comprising:

a first emphasis amount determiner for determining a main-emphasis amount suitable for the normal recording mode; and a second emphasis amount determiner for determining a main-emphasis amount suitable for the simple high-band recording mode, wherein said single pre-emphasis means emphasizes a high frequency band of each input luminance signal which is input in one of the normal recording mode and the simple high-band recording mode, within the limits of the main emphasis amount determined by one of said first emphasis amount determiner and said second emphasis amount determiner.

3. A record modulation circuit according to claim 2, further comprising:

a first clipping amount determiner for determining a clipping amount suitable for a normal recording mode; and a second clipping amount determiner for determining a clipping amount suitable for the simple high-band recording mode, wherein said single clipping means limits the level of each emphasized luminance signal which is input in the normal recording mode and the simple high-band recording mode, less than the clipping amount determined by one of said first clipping amount determiner and said second clipping amount determiner.

4. A record modulation circuit according to claim 3, further comprising a second pre-emphasis means for emphasizing a high frequency band of said FM-converted luminance signal in the simple high-band recording mode.

5. A record modulation circuit according to claim 4, wherein said second pre-emphasis means emphasizes a frequency component an 8 MHz band.

6. A record modulation circuit according to claim 1, further comprising a chrominance signal emphasis means for enhancing the low-band-converted chrominance signal which is output from said frequency converter, and supplying the recording head with the enhanced low-band-converted chrominance signal, in the simple high-band recording mode.

* * * * *